United States Patent
Althaus et al.

(10) Patent No.: US 7,110,865 B2
(45) Date of Patent: Sep. 19, 2006

(54) METHOD FOR POWER ADAPTATION IN AN ELECTRICITY NETWORK

(75) Inventors: Rolf Althaus, Flawil (CH); Martin Koller, Baden (CH); Karl Wiederhold, Bruchsal (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/519,985

(22) PCT Filed: Jun. 30, 2003

(86) PCT No.: PCT/CH03/00432

§ 371 (c)(1),
(2), (4) Date: Aug. 29, 2005

(87) PCT Pub. No.: WO2004/006409

PCT Pub. Date: Jan. 15, 2004

(65) Prior Publication Data

US 2006/0007613 A1    Jan. 12, 2006

(30) Foreign Application Priority Data

Jul. 4, 2002    (CH) .................................... 1178/02

(51) Int. Cl.
G05D 17/00    (2006.01)
H02J 4/00    (2006.01)

(52) U.S. Cl. .................. 700/295; 700/297; 307/126

(58) Field of Classification Search ........... 307/18–29, 307/64–69, 125, 126, 139, 140; 700/286–298, 700/295, 297
See application file for complete search history.

(56) References Cited

U.S. PATENT DOCUMENTS

| | | | | |
|---|---|---|---|---|
| 4,287,465 A | * | 9/1981 | Godard et al. .............. | 320/101 |
| 4,312,179 A | * | 1/1982 | Zaugg ......................... | 60/778 |
| 4,686,822 A | * | 8/1987 | Frutschi ...................... | 60/772 |
| 5,778,675 A | * | 7/1998 | Nakhamkin .................. | 60/652 |
| 6,026,349 A | * | 2/2000 | Heneman ..................... | 702/60 |
| 6,134,124 A | * | 10/2000 | Jungreis et al. .............. | 363/34 |
| 6,153,943 A | * | 11/2000 | Mistr, Jr. ..................... | 290/52 |
| 6,184,593 B1 | * | 2/2001 | Jungreis ...................... | 307/64 |
| 6,670,721 B1 | * | 12/2003 | Lof et al. .................... | 290/44 |
| 6,900,556 B1 | * | 5/2005 | Provanzana et al. .......... | 307/19 |
| 7,002,260 B1 | * | 2/2006 | Stahlkopf .................... | 290/44 |

FOREIGN PATENT DOCUMENTS

| | | | | |
|---|---|---|---|---|
| DE | 2263051 A | * | 7/1974 | |
| DE | 2756490 A | * | 7/1979 | |
| GB | 2020367 A | * | 11/1979 | |

* cited by examiner

*Primary Examiner*—Maria N. Von Buhr
(74) *Attorney, Agent, or Firm*—Cermak & Kenealy, LLP; Adam J. Cermak

(57) ABSTRACT

According to the invention, power matching in an electricity grid (N) is carried out by regulation of a storage power station (S) which is operated in the grid. In the event of changes in the power available or in the power consumption in the grid, the power consumption of the power consuming machine (V) in the storage power station is adapted so as to maintain equilibrium between the total power generation and the total power consumption. Power matching by regulation of the power load can be carried out around one order of magnitude more quickly than power matching by regulation of power generating machines (G1, G2, G3, GS) which act on the grid, and saves alternating thermal loads in the power stations.

20 Claims, 4 Drawing Sheets

METHOD FOR POWER ADAPTATION IN AN ELECTRICITY NETWORK

TECHNICAL FIELD

The present invention relates to a method for power matching in an electricity grid, as claimed in the precharacterizing clause of claim 1.

PRIOR ART

The power consumption of the energy loads and the power output of the electricity generators must be kept in equilibrium within narrow limits in an electricity grid in order to avoid overfrequencies or underfrequencies in the grid, which can each lead to total failure. In this case, it must be possible to react to very fast changes at the generating end and at the demand end. In liberalized electricity markets, coverage for transient power demands, such as those which occur when a major load is connected or disconnected, but which really occur when a major power station block fails, is very highly lucrative. A very large amount of money can be earned even by purely providing appropriate capacities. The capability to support the frequency is questionable when electricity generating systems fail. In the first fractions of a second following the failure of an electricity supply, the grid frequency can be kept within the permissible tolerance in a large grid without any problem just by the rotating masses of the remaining power stations. However, after this, power reserves must be available immediately in order to prevent underfrequency, and thus failing of the entire grid. Steam power stations which can be operated on a slightly throttled-back basis can provide power in the order of magnitude of around 5% of their maximum power very quickly; however, they require several tens of minutes to cope with power increases beyond this up to, for example, 30% of their maximum power. When a major load is connected to grid, the power stations have to cope with load ramps in which it is necessary to provide considerable additional power in the region of seconds or in less than ten minutes. Gas turbine systems and combination systems allow such increases to be coped with within minutes. An air turbine or a combined air/gas turbine in a storage power station of the cited type has a comparable reaction. It is also known from experience in operation that rapid load changes such as these result in high temperature gradients and, as a consequence of this, in damaging alternating thermal loads and mechanical stresses particularly in the hot gas path, which is already highly thermally loaded in any case, in gas turbine sets, or in the steam generators of steam and combination power stations. All the non-steady-state power demands must also be satisfied in an electricity grid, for stable and reliable operation. Particularly in liberalized electricity markets, it is very highly advantageous not only for a grid operator but also for a power station operator to have resources in his portfolio to satisfy all of these load demands. Geodetic hydroelectric power stations are admittedly able to mobilize significant power reserves within seconds; however, their availability is, of course, limited. According to the prior art, different power station types are therefore required to satisfy the different requirements, driving investment costs to a high level.

DE 27 56 490 describes a power station system having a motor-driven compressor and having a turbine which drives a generator, as well as having an intermediate air store. According to this document, the drive motor for the compressor is shut down, or its power consumption is reduced, as a reaction to sudden increases in the grid power demand. The turbine remains under an approximately constant load.

DESCRIPTION OF THE INVENTION

One aspect of the present invention is thus to specify a method of the type mentioned initially, which avoids the disadvantages of the prior art. This aspect of the invention is based in particular on specifying one possible way to carry out power matching in an electricity grid when rapid changes occur both at the power generating end and at the demand end, in as efficient a manner as possible. In this case, the aim is to provide a capability to react both to sudden changes and to steep load ramps.

This aspect can be achieved by use of the totality of the features from claim 1.

Against the background of an electricity grid which, in addition to two or more power loads and power generators, has a storage system which has at least one power-consuming machine and a power-generating machine, one aspect of the invention is thus to react to transients in the power generated or the power consumption in the grid by appropriate adaptation of the power consumed in the power consuming machine, and to reproduce an equilibrium between the power generated and the power consumption in the grid by this control action or at least with its support. In practice, it has been found that load gradients of around at least one order of magnitude more can be achieved by regulation of or even switching off the power consuming machine, by means of a control action on the power generating machine in the storage system. In one method variant, the power output of the power generating machine and of the other power stations in the grid is, in a first step, kept constant; in a larger electricity grid, when a power station is disconnected from the grid or a load is connected to the grid, the available frequency support capacities which are kept available to a limited extent, particularly in steam power stations, are in fact activated in parallel. Furthermore, power matching by means of the power consuming machine in a storage system has the advantage that the power transient per se has no effect in a thermally highly loaded power generating structure, but on a considerably less loaded power consuming structure. Air storage systems can be used in particular for this purpose since these intrinsically have, for example, separately arranged turbines and compressors, as well as a store in which compressed fluid is temporarily stored in order to drive the power generating machine and is available even when the power consuming machine is at rest or is consuming a reduced power. The power output of all the power generating machines which act on the grid is preferably kept constant in a first step, unless they have special frequency supporting capabilities.

A first advantageous initial operating state of the machines which are connected to the grid is that in which the power consuming machine and the power generating machine in a storage system are operated in a first equilibrium state between power generation and power consumption of the grid such that the mass flow which is conveyed to the storage volume is equal to the mass flow which flows out of the storage volume via the power generating machine in the storage system; this allows constant continuous operation. In this case, the power consuming machine is advantageously operated on a partial load, for example at 50% of its maximum power consumption. At the same time, the storage volume is preferably filled to between 25% and 75%, with this percentage being related to the difference between a minimum and a maximum permissible pressure in the storage volume for operation of the storage system. This mode of operation still makes it possible to change the power consumption of the power consuming machine in either direction when a lack of equilibrium occurs, that is to say in the direction of an increased or reduced power consumption.

Another initial operating state of the machines which are connected to the grid, in which the maximum capability is provided for suddenly increasing the power in order to support the frequency or for a power ramp, is an operating state in which the power consuming machine in a storage system is being operated at maximum power. The entire power consumption of the power consuming machine can thus in principle be made available to the grid simply by opening a switch. In a second step, the power of the power generating machine in the storage system can be increased, albeit considerably more slowly, if it is not being operated at maximum power in the initial operating state. With regard to the storage system, an initial operating state to this extent appears to be desirable in which the power consuming machines are run at full power consumption, and the power generating machines are stationary or are idling. In absolute terms, an initial operating state such as this actually provides the greatest potential to increase the power. However, the proportion of the power to be applied by the power generating machines is available only with a delay since power generating machines which are idling—or to be more precise their generators—must first of all be synchronized to the grid. In the interest of maximum power dynamic response, it has therefore been found to be advantageous to keep the power generating machines in a state in which they are already synchronized to the grid, but with a low power output to the grid. Thus, all of the power consuming machines in at least one storage system which can be connected to the grid and operated at at least 80% of their maximum power consumption. At the same time, all the power generating machines in this storage system are synchronized to the grid, and are operated at a power output which is as low as possible, preferably of less than 10% or even less than 20% of their maximum power output; however, operating reasons may also demand a higher minimum power. Starting from this initial operating state, it is possible to switch the power consuming machines off by opening switches when a rapid power demand occurs, and at the same time to issue a power increasing command to the power generating machines. The power previously being consumed by the power consuming machines is then instantaneously available to the grid, and the power of the power generating machines is made available with a delay time that is intrinsic to the system and in particular with a power gradient whose maximum gradient is limited, but without having to wait for synchronization in advance. The power dynamic response for a situation in which there is rapid reduction in the power output or an increase in the power consumption in the grid is thus maximized.

If two or more storage systems are available in the grid, it would also be possible to operate one of the systems with the power consuming machine consuming the maximum power and one with the minimum power consumption, such that each of the systems can react in one direction—excess power or lack of power—by regulation of the power consuming machine.

One idea is to use the power consuming machine that is feeding a store to apply a secondary power consumption, which can in principle be switched off as required, in addition to the actual power loads in an electricity grid, in the form of a bias, and for the net available power to be increased when required virtually instantaneously by reducing or by switching off the secondary power consumption. The power output of the power generating machine in the storage and in the other power stations in the grid can in this case be kept constant, at least in a first step. Conversely, as explained above, it is also possible to increase this secondary power consumption very quickly in order to react to excess power intrinsically existing in the grid without having to take rapid control actions in the power stations connected to the grid.

It can also be highly advantageous for the power stations which are connected to the grid to delay the original power transients in a subsequent step of the method, and to carry them out more slowly, and for the power consuming machines to be returned back to an initial operating state in order to reproduce the capability to react to a lack of power equilibrium in the grid.

The extremely wide load regulation range which a storage system, in particular an air storage system, can cope with for power matching according to an aspect of the invention in an electricity grid is worth mentioning. Specifically, based on a rule of thumb that around two thirds of the gross turbine power in a gas turbine is consumed in the compressor, it can easily be estimated that, based on steady-state operation of the system when in equilibrium, 200% of the instantaneous net power output is available instantaneously by switching off the compressors! The entire load regulation range of the system can then—based on the compressor being designed for steady-state operation at equilibrium with the power generating machine as 100%—be suddenly changed to a net power output of −200% to +300% of the rated power that is available when operating at equilibrium. A range of 200% of the system rated load can be covered just by compressor regulation, which can be carried out very quickly and without any additional load on high-temperature components. This range could be extended even further by an appropriately larger design of the compressor, in which case partial load operation, for example of a turbocompressor, can be coped with very efficiently by speed regulation—in fact, the compressor need not be operated in synchronism with the grid.

In a corresponding manner, in one embodiment of the method, when a power generating system is disconnected from the grid or an additional load is connected to the grid, the power consumption of the power consuming machine is reduced in a first step, or is completely disconnected from the grid. In this case, the frequency supporting capability of other power stations can be activated at the same time. In a further step, the power output of other power stations or of the power generating machine in the storage system can be increased considerably more slowly, with the power consumption of the power consuming machine also being increased to the same extent, and at the same time. Conversely, when a load is disconnected from the grid, the power consumption of the power consuming machine is increased in a first step, in order to maintain the equilibrium between power generation and power consumption in the grid. Then, in a further step, and likewise considerably more slowly than the power consuming machine reacts in a first step, the power generation from other power stations is reduced and the power consumption of the power consuming machine is reduced to the same extent.

Further advantageous effects and embodiments of the invention will become evident in the light of the exemplary embodiments described in the following text, or as specified in the claims.

BRIEF DESCRIPTION OF THE DRAWINGS

The invention will be explained in more detail in the following text with reference to exemplary embodiments which are illustrated in the drawing, and in which, in detail.

In this case, the described exemplary embodiments represent only a minor instructive detail of the invention as characterized in the claims.

Approach to Implementation of the Invention

Figure 1:
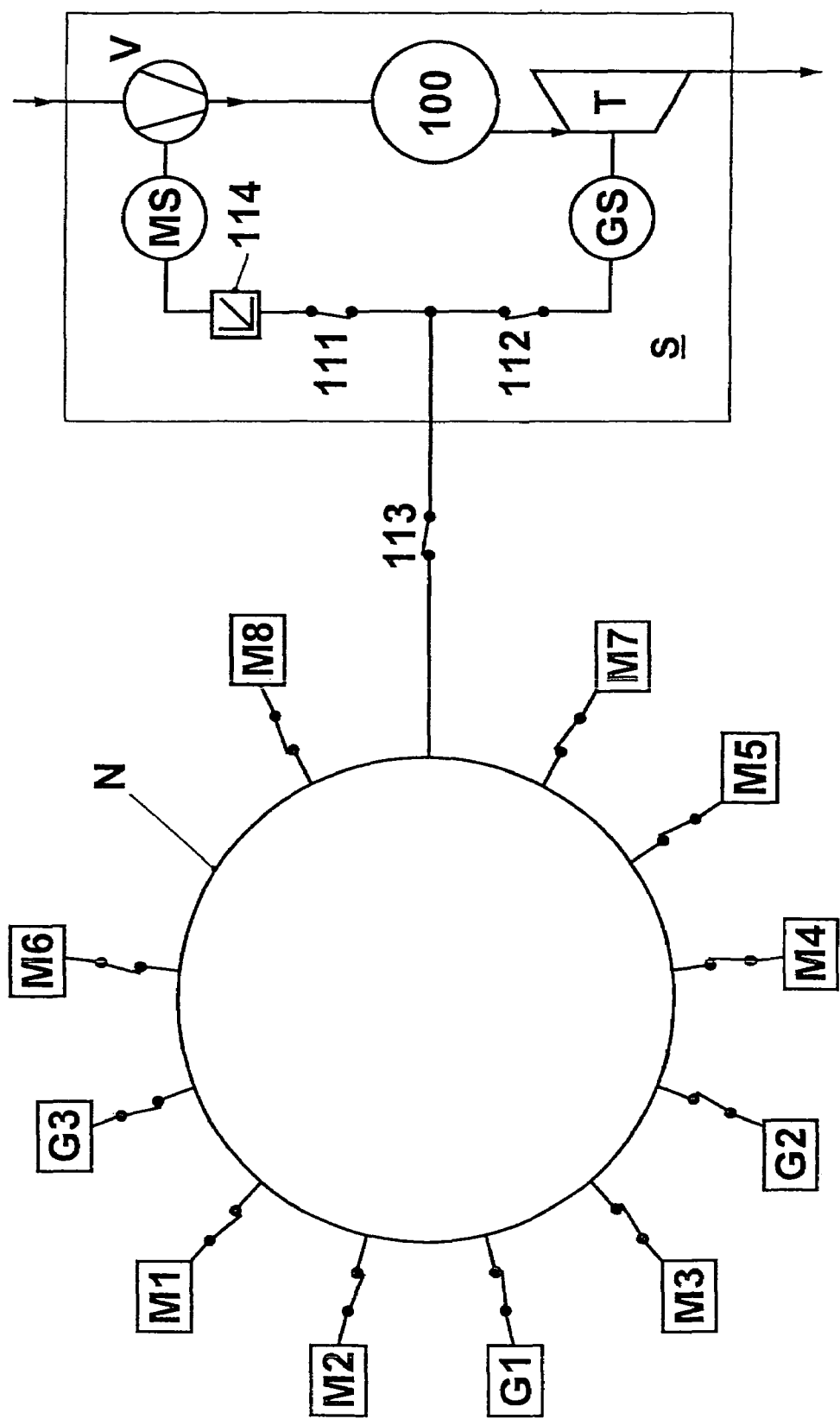
FIG. 1 shows an electricity grid which can be operated according to the invention.

FIG. 1 shows an electricity grid N, highly schematically. Loads M1 to M8, three power stations or their generators G1 to G3, and an air storage power station S can be connected to the electricity grid via grid switches. An air storage power station such as this has been disclosed, for example, in DE 28 22 575, which disclosure is incorporated by reference and represents an integral component of the present invention. The air storage power station S has at least one compressor V for filling a storage volume 100 with an energy storage fluid, as well as a turbine T which can be operated with the fluid from the storage volume 100. The turbine T drives a generator GS which produces electrical power which can be fed into the electricity grid via the switch 112. The compressor V is driven by a motor MS, which consumes a controllable amount of electrical power via the switch 111 and the regulator 114. The difference between the power output of the generator GS and the power consumption of the motor MS is fed into the grid N via the switch 113, as the net power output of the storage power station S. If the power consumption of the compressor V or of its drive motor MS is greater than the power produced in the generator GS, the storage power station S draws power from the grid via the switch 113. In a first operating state, all the power loads M1 to M8 and all the generators G1 to G3 as well as the storage power station S are connected to the grid. The power consumption of all the loads M1 to M8 and of the drive motor MS, and the power output of all the power stations G1 to G3 and of the generator GS are matched at nominal grid frequency. Equilibrium between the power consumption and the power output exists in the grid. If one of the power stations G1 to G3 fails, or if a load is connected or if a load is disconnected from the grid, this results in a lack of equilibrium, which leads to overfrequency or underfrequency in the grid, unless an immediate control action is taken for power matching. According to an aspect of the invention, the particular capabilities of the storage power station S are used for this action, since it can act both as a power load and as an electricity generator. It has been found to be very particularly advantageous for the power matching to be carried out by means of a control action on the power consuming machine V in the storage power station. If, for example, for whatever reasons one of the power stations G1 to G3 is disconnected from the grid by opening the grid switch, the power budget within the grid is no longer balanced, and the grid frequency reacts to this by failing. Normally, the power stations which are still connected to the grid react to this and increase the power as quickly as possible in order to support the frequency. As described initially, the capabilities of power stations to react quickly differ widely. Furthermore, such rapid load changes on power stations result in structural loads on expensive power station components.

In addition, the corresponding power reserves must be maintained, which leads to expensive investments not being fully utilized, and power stations not running at their best operating point during normal operation. Overall, these factors make it very expensive to maintain and produce power for frequency support and to satisfy steep load ramps. From the technical point of view, it would, of course, in fact be desirable to first of all disconnect appropriate power loads from the grid when a power station fails, although, for obvious reasons, this is not possible without problems. In accordance with another aspect of the invention a method can equally make use of the capability to disconnect loads from the grid, for example in the event of a failure of power generating capacities, but without affecting one of the numerous loads M1 to M8 in the process. This is achieved by the specific method of operation of the storage power station S as described in the following text. As described in the introduction, an air storage power station S as illustrated is operated in the storage mode at times when the loads are low, for example at night or over the weekend. The switch 112 is opened and the switch 111 is closed, such that the motor MS drives the power consuming machine, the compressor V, which passes air or some other energy storage fluid into the storage volume 100. No fluid flows out of the storage volume 100. The storage power station S then just consumes power from the grid. This power consumption makes it possible to operate basic load units such as nuclear power stations or else coal-fired steam blocks at high power even at times when the load is low, thus making it possible to make better use of their high investments. At times when there is a medium load on the grid, the storage power station S is shut down, and the entire power demand is covered by the power stations G1 to G3, which are operated close to their best operating point. At peak load times, the switch 112 is closed and the turbine T is driven by the energy storage fluid which has been stored in the storage volume 100, and itself drives the generator GS, from which a power demand which cannot be covered by the power stations G1 to G3 is fed into the grid. Use can be made of the knowledge that the motor MS in a storage system S can also be operated as a secondary load, analogously to a "bias voltage" in the electricity grid, even at times when there is a medium or high electricity demand. The storage system S is, for example, operated in such a way that the mass flow passed from the compressor V to the storage volume 100 during normal operation is equal to the mass flow flowing out via the turbine T. Depending on the electricity price to be achieved or to be paid for at any given time, the storage system can in this case also be operated, of course, in the storage mode or in the discharge mode; the motor MS should apply a load to the electricity grid N even when the net power output is positive so that, in global terms, the storage power station S does not represent a load. When sudden changes occur in the power demand on the storage system S, such as those, and to a particular extent, which occur in the event of failure of one of the power stations G1 to G3 and when a major load is connected to the grid, this secondary load can be changed considerably more efficiently and more quickly than the capability to provide additional power. If, by way of example, one of the power stations G1 to G3 has to be disconnected from the grid, the power consumption of the motor MS can be reduced by a simple circuitry means, which are known per se, or the switch 111 can be opened entirely. This results in additional power being available virtually instantaneously, which was previously consumed by the motor MS, for the loads M1 to M8. In this case, it is possible to continue operating the turbine T without problems with energy storage fluid provided from the storage volume 100. In a next step, the power of the turbine T can, for example, be increased or it can be started up; in addition, further power stations which are connected to the electricity grid can increase their power or can connect additional resources to the electricity grid in order to compensate for the initial power station failure; the motor MS and thus the compressor V in the storage system S can then resume operation successively.

Conversely, it is, of course also possible, when a load M1 to M8 is disconnected from the grid, to compensate for the drop in the power consumption in the grid N in a first step by immediately and quickly increasing the power consumption in the compressor V, in which case this change in power can be taken over slowly and successively by the power stations G1 to G3 and the turbine T, during which process the compressor V can be returned to its initial operating state.

Figure 2:
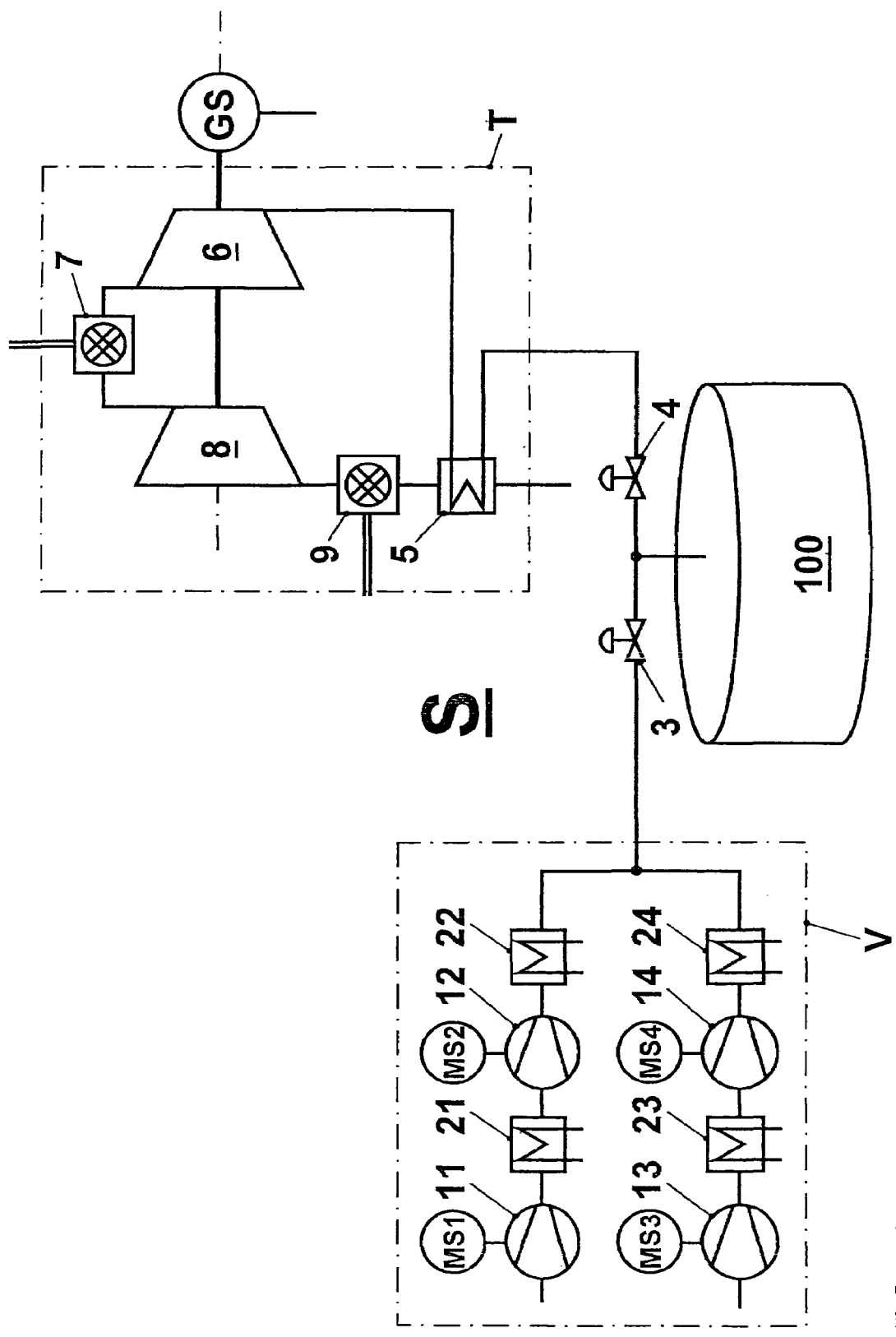
FIG. 2 shows an example of the embodiment of a storage power station.

The storage power station S is illustrated in a highly schematic form in FIG. 1. FIG. 2 shows an example of an embodiment of a storage power station S. The power consuming machine formed by the compressor V in this case comprises two compressor runs, each having two compressors and two coolers. A first compressor 11 or 13 in each compressor run compresses air to an intermediate pressure. The air is intermediately cooled in a cooler 21 or 23, and is compressed in a second compressor 12 or 14 to a final pressure, which is typically in a range from 30 to 100 bar, or 50 to 100 bar. The compressors are driven by drive motors MS1, MS2, MS3 and MS4. The compressed air flows through a throttle and shut-off element 3 into the storage volume 100. Stored air flows via a throttle and shut-off element 4 to the turbine unit T. Within this turbine unit T, the air first of all flows through an exhaust gas heat exchanger 5, where it is heated, for example, to 550° C. The air is then expanded in an air turbine 6 to a pressure of around 10 to 15 bar. The state of the air at the output from the air turbine 6 is in fact comparable to the state at the compressor outlet of a gas turbine set. For this reason, the combustion chamber 7 and the turbine 8 of a gas turbine set can very particularly advantageously be arranged downstream from the air turbine. A fuel is burnt in the air in a manner known per se in the combustion chamber 7, resulting in the production of a compressed hot gas, which is expanded in the turbine 8, producing work, to approximately the environmental pressure. The expanded hot gas is optionally reheated in a further burner 9, and then flows through the exhaust gas heat exchanger 5, in which the residual heat from the exhaust gas is transferred to the supply air to the air turbine 6. The air turbine 6 and the gas turbine 8 in the turbine unit are arranged on a common shaft, and drive the generator GS. In contrast to a conventional gas turbine set, the compressor and turbine are mechanically completely decoupled from one another and, as a result of the intermediate storage volume in the flow path, the fluid-mechanical coupling also has a certain amount of elasticity. This makes it possible for the turbine unit T and the compressor unit V to be operated independently of one another, in such a manner, as described above, to react in a very highly flexible manner to different power demands by means of two mechanisms, specifically by means of the power consumption of the compressor unit and the power output of the turbine unit, and to increase the net power output virtually instantaneously, in particular by switching off compressors which consume power. In this case, the compressor runs, which are arranged in parallel in the mass flow, can likewise be regulated independently of one another, thus further simplifying the power regulation of the entire storage system S.

Figure 3:
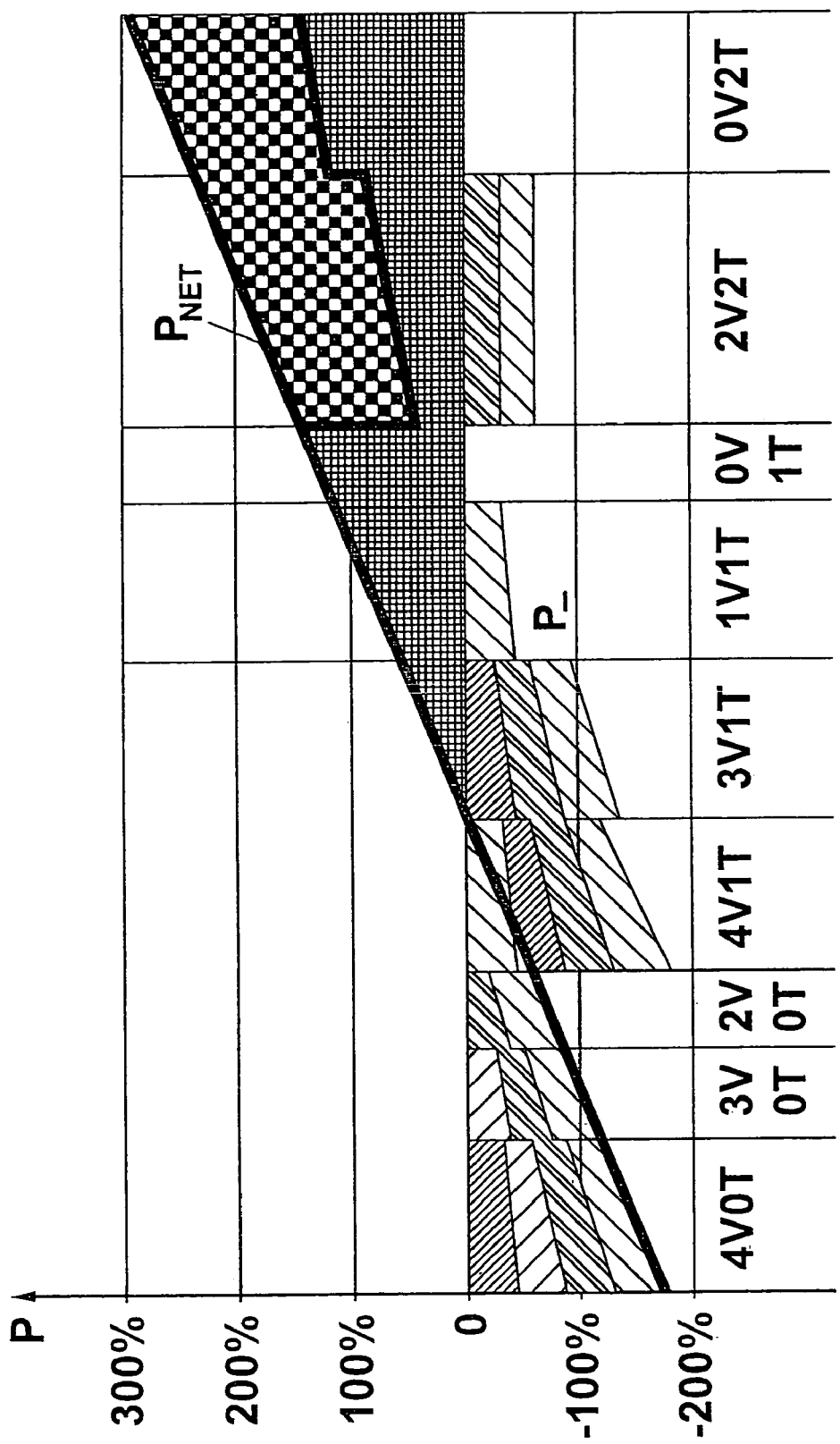
FIG. 3 shows an example of an operating concept for a storage power station showing a function of the net power output.
Figure 4:
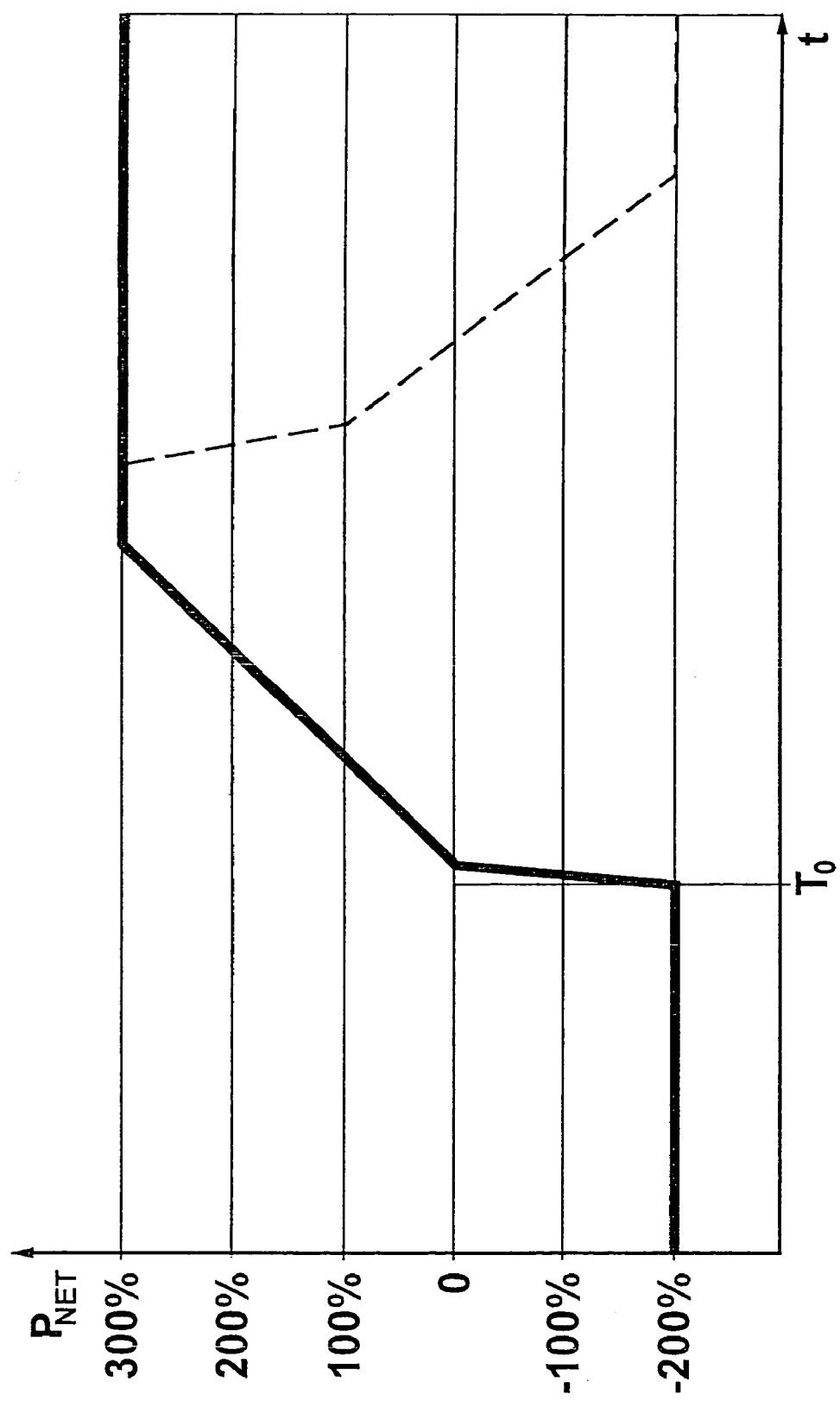
FIG. 4 shows an example of power output dynamic response which can be achieved according to the invention.

It is advantageous for the controllability of the storage system for two or more independently controllable compressor runs to be arranged in parallel in the mass flow as power loads and likewise for two or more turbine units T to be connected to a storage volume in parallel in the mass flow, as power generators. By way of example, FIG. 3 shows an operating concept for a storage power station having four compressor runs and two turbine units. In this case, 100% power is defined as the net power output PNET which results when both turbine units and all four compressor runs are being operated at maximum power in an equilibrium state with respect to the mass balance of the storage volume 100. The line which crosses the graph diagonally and is annotated PNET represents the net power output. The part annotated P–below 100% is the respective power consumption of the compressors. In a first operating area, which is annotated 4V0T, starting at –200% net power output, that is to say 200% net power consumption, all four compressor runs and none of the turbines are in operation. As the power consumption falls, the power consumption of all four compressor runs is slowly reduced, until one of the compressor runs is taken out of operation at one point. Three compressor runs are then operated with full power consumption, which can likewise be reduced slowly; this area is annotated 3V0T. This is followed by an area 2V0T with a lower net power consumption, in which two compressor runs and no turbine units are operated. Following this, a first turbine unit is operated, and all four compressor runs are operated at the same time. In the area 3V1T, three compressor runs and one turbine unit are in operation, and one compressor run and one turbine unit are in operation in the area 1V1T, and so on. At 150% net power output, the second turbine unit is started up, with two compressor runs being operated at the same time. The maximum peak load net power is achieved when both turbine units are being operated at full load and no compressor run is being operated, that is to say in the area 0V2T. The net power output is then 300%. The power which is in each case shown below 0% is the respective power consumption of the compressors, and represents the power which can be made available immediately as additional net power in the manner described above. Equilibrium operation is achieved, for example, when both turbine units and all four compressor runs are running on full load, thus resulting in 100% net power output; the power consumption of the compressors is then 200%; this means that the storage power station is able to compensate immediately and without any delay for the failure of one power station block whose power corresponds to twice its own rated power! This capability for frequency support and the wide control range underscore the superiority of a storage power station that is operated according to the above described embodiment of the invention. net power is achieved when both turbine units are being operated at full load and no compressor FIG. 4 illustrates, schematically, the power dynamic response which can be achieved by an embodiment of a method according to the invention. The vertical graph axis shows the net power output PNET, with negative values indicating power consumption, while the horizontal graph axis shows the time. This is based on an initial operating state in which, as already described a number of times, the power consuming machines are running at full power, and the power generating machines are actually just synchronized to the grid, or are being operated at a very low power, up to a maximum of 20% of the maximum power. Furthermore, quantitatively, it is assumed that, when the power generating machines are being operated on full load in the steady state, two thirds of the total power generated is required for compression of the working fluid, and that the power consuming machines are designed for the maximum power at this operating point. It would, of course, also be possible to design the power consuming machines to be larger, and thus to cover an even wider power range. In the initial operating state, the net power output is −200%; power is thus drawn from the grid. At the time t=T0, a maximum amount of additional power is drawn from the power generating system. This then reacts to disconnection of the power consuming machines so that, in practice, 200% power is released instantaneously; the net power output is then 0%. Even during controlled running down of compressors that are being used as power consuming machines, it is possible to achieve typical power gradients around 120% per minute, with respect to the system rated power, which has already been defined a number of times! At the same time, the power output from the power generating machines is increased, in fact, leads considerably more slowly to a further increase in power up to 300%. It must be stressed that the additional useful power in a storage system such as an air storage system can be produced per se very quickly although, in all cases this takes place at least one order of magnitude more slowly than is possible by reducing or switching off the power consumption of the power consuming machines in the storage power station. Typically, it can be assumed that the power generating machine can accept power with a gradient of around 15% per minute.

The dashed line shows the dynamic response with which the power station system can advantageously react to a falling power demand. In this case, a decreasing net power output is first of all achieved by controlled acceleration of the power consuming machine at, for example, 120% per minute, thus making it possible to achieve a reduction in the net power output of around 200% of the system rated power in 100 seconds. In the event of greater load changes, the power output of the power generating machine is also changed. This is where one point of interest comes into play. A storage system of the type described above can allow rapidly successive load cycles of up to 200% of the system rated power to be followed without having to subject thermally highly loaded components to an alternating load. The power regulation can be carried out completely by the power consuming machines, within this order of magnitude. Reference should once again be made to FIG. 2, in order to estimate its alternating temperature load. If the storage pressure is assumed to be 100 bar, with the same pressure ratio in each of the series connected compressors 11 and 12 or 13 and 14, compression from an environmental state at 15° C. and intermediate cooling in the cooler 21, 23 to ambient temperature are achieved subject to the precondition of isotropic compression, and maximum temperatures of little more than 300° C., and this is still around 250° C. with a storage pressure of 50 bar. These temperatures are, of course, considerably lower than those in the power consuming machine, for which reason alternating loads pose considerably less loads on the structures. As has been mentioned a number of times above, the power range to be covered solely by compressor regulation can be increased further by designing the compressors to be appropriately larger.

The technology of air storage turbines and their use for peak load coverage are well known and proven in engineering. Furthermore, proven standard components can be used to a wide extent for the construction of a power station that is to be operated according to the invention.

LIST OF REFERENCE SYMBOLS

3 Shut-off and throttling element
4 Shut-off and throttling element
5 Heat exchanger, exhaust gas heat exchanger, recuperator
6 Air turbine
7 Combustion chamber
8 Gas turbine
9 Duct firing
11 Compressor
12 Compressor
13 Compressor
14 Compressor
21 Intercooler
22 Air cooler
23 Intermediate cooler
24 Air cooler
100 Storage volume
111 Switch
112 Switch
113 Grid switch
114 Regulator
G1, G2, G3
Power stations
GS Generator for the power generating machine in the storage power station
M1, M2, M3, M4, M5, M6, M7, M8
Loads
MS Drive motor for the power consuming machine in the storage power station
MS1, MS2, MS3, MS4
Drive motors for the power consuming machine in the storage power station
S Storage power station
T Turbine unit, power generating machine
V Compressor unit, power consuming machine
$P_{NET}$ Net power output
P_ Power consumption of the power consuming machine

The invention claimed is:

1. A method for power matching in an electricity grid, the grid comprising at least two power generating plants supplying power output into the grid, at least two power loads consuming power from the grid, at least one storage plant, at least one storage volume, at least one power generating machine for operation with an energy storage fluid which is stored in the storage volume, the power generating machine being connected to a generator which supplies electrical power during operation, at least one power consuming machine for feeding energy storage fluid into the storage volume, the power consuming machine being connected to a motor which consumes electrical power during operation, wherein, in a first operating state, an overall power supply includes the sum of the power output supplied from all the power generating plants and from the power generating machine and equals an overall power consumption that includes the sum of the power which is consumed by all the power loads and by the power consuming machine, such that the grid is in equilibrium, comprising:

upon a sudden change in power demanded from the storage plant, controlling the power consumption of the power consuming machine such as to maintain the equilibrium between the overall power consumption and the overall power supply into the grid, and changing the power consumption of the power consuming machine in a direction opposite to the direction taken during controlling, with the changing in the power consumption being carried out slower than during controlling, and the changing being at least partially compensated for by changing the power output of the power generating machine, such that, when an initial rise occurs in the power demand, the power consumption of the power consuming machine is reduced, and the power output of the power generating machine is successively increased with the power consumption of the power consuming machine being increased, and when an initial drop occurs in the power demand, the power consumption of the power consuming machine is increased, and the power output of the power generating machine is successively reduced with the power consumption of the power consuming machine being reduced.

2. The method as claimed in claim 1, further comprising:
carrying out power matching by controlling the power consumption of the at least one power consuming machine in the at least one storage plant and any frequency response capabilities which may be present, wherein the power output from the at least one power generating machine of the at least one storage plant and other power plants connected to the grid is maintained constant.

3. The method as claimed in claim 1, wherein power consumption of the power consuming machine is reduced when one of the power generating plants is disconnected from the grid or when one of the loads is connected to the grid.

4. The method as claimed in claim 3, wherein the drive motor for the power consuming machine is completely disconnected from the grid.

5. The method as claimed in claim 1, wherein power consumption of the power consuming machine is increased when one of the loads is disconnected from the grid or is rapidly deloaded.

6. The method as claimed in claim 1, further comprising:
operating the at least one power consuming machine in the at least one storage plant at at least 80% of its maximum power consumption in order to maintain a maximum power dynamic response, and
synchronizing and connecting the generator of the at least one power generating machine in said storage plant to the grid, and operating the power generating machine at a minimum permissible power.

7. The method as claimed in claim 6, further comprising:
operating the power generating machine at less than 20% of its maximum power output.

8. The method as claimed in claim 2, wherein power consumption of the power consuming machine is reduced when one of the power generating plants is disconnected from the grid or when one of the loads is connected to the grid.

9. The method as claimed in claim 8, wherein the drive motor for the power consuming machine is completely disconnected from the grid.

10. The method as claimed in claim 2, wherein power consumption of the power consuming machine is increased when one of the loads is disconnected from the grid or is rapidly deloaded.

11. The method as claimed in claim 2 further comprising,
operating the at least one power consuming machine in the at least one storage plant at at least 80% of its maximum power consumption in order to maintain a maximum power dynamic response, and
synchronizing and connecting the generator of the at least one power generating machine in said storage plant to the grid, and operating the power generating machine at a minimum permissible power.

12. The method as claimed in claim 3 further comprising,
operating the at least one power consuming machine in the at least one storage plant at at least 80% of its maximum power consumption in order to maintain a maximum power dynamic response, and
synchronizing and connecting the generator of the at least one power generating machine in said storage plant to the grid, and operating the power generating machine at a minimum permissible power.

13. The method as claimed in claim 4 further comprising,
operating the at least one power consuming machine in the at least one storage plant at at least 80% of its maximum power consumption in order to maintain a maximum power dynamic response, and
synchronizing and connecting the generator of the at least one power generating machine in said storage plant to the grid, and operating the power generating machine at a minimum permissible power.

14. The method as claimed in claim 5 further comprising,
operating the at least one power consuming machine in the at least one storage plant at at least 80% of its maximum power consumption in order to maintain a maximum power dynamic response, and
synchronizing and connecting the generator of the at least one power generating machine in said storage plant to the grid, and operating the power generating machine at a minimum permissible power.

15. The method as claimed in claim 11, further comprising:
operating the power generating machine at less than 20% of its maximum power output.

16. The method as claimed in claim 12, further comprising:
operating the power generating machine at less than 20% of its maximum power output.

17. The method as claimed in claim 13, further comprising:
operating the power generating machine at less than 20% of its maximum power output.

18. The method as claimed in claim 14, further comprising:
operating the power generating machine at less than 20% of its maximum power output.

19. The method as claimed in claim 6, further comprising:
operating the power generating machine at less than 10% of its maximum power output.

20. The method as claimed in claim 11, further comprising:
operating the power generating machine at less than 10% of its maximum power output.

* * * * *